(12) United States Patent
Gehringer et al.

(10) Patent No.: US 9,193,862 B2
(45) Date of Patent: Nov. 24, 2015

(54) BLENDS FOR COMPOSITE MATERIALS

(71) Applicant: BASF SE, Ludwigshafen (DE)

(72) Inventors: Lionel Gehringer, Schaffhouse-pres-Seltz (FR); Gregor Daun, Neckargemued (DE); Michael Henningsen, Frankenthal (DE); Rainer Klopsch, Worms (DE); Olivier Fleischel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 247 days.

(21) Appl. No.: 13/773,028

(22) Filed: Feb. 21, 2013

(65) Prior Publication Data

US 2013/0217806 A1    Aug. 22, 2013

Related U.S. Application Data

(60) Provisional application No. 61/601,569, filed on Feb. 22, 2012.

(51) Int. Cl.
  *C08L 63/00* (2006.01)
  *C08G 59/22* (2006.01)
  *C08G 59/50* (2006.01)

(52) U.S. Cl.
  CPC .............. *C08L 63/00* (2013.01); *C08G 59/223* (2013.01); *C08G 59/226* (2013.01); *C08G 59/50* (2013.01); *C08G 59/504* (2013.01); *C08G 2650/50* (2013.01); *C08L 2205/02* (2013.01)

(58) Field of Classification Search
  CPC ....................................................... C08L 63/00
  USPC ......................................... 523/428, 439, 400
  See application file for complete search history.

(56) References Cited

U.S. PATENT DOCUMENTS

| 3,305,527 | A | 2/1967 | Price |
| 6,207,733 | B1 * | 3/2001 | Feola et al. ................... 523/466 |
| 7,820,779 | B2 * | 10/2010 | Birukov et al. ............... 528/196 |
| 2009/0137702 | A1 * | 5/2009 | Muller-Frischinger ....... 523/400 |
| 2011/0130524 | A1 * | 6/2011 | Wittenbecher et al. ....... 525/523 |
| 2011/0190419 | A1 | 8/2011 | Wittenbecher et al. |
| 2011/0306702 | A1 | 12/2011 | Klopsch et al. |

FOREIGN PATENT DOCUMENTS

| EP | 2 307 358 | 4/2011 |
| JP | 2002-187936 | 7/2002 |
| WO | WO 2010/010045 A1 | 1/2010 |
| WO | WO 2010/010048 A1 | 1/2010 |
| WO | WO 2011/112405 A1 | 9/2011 |
| WO | WO 2011/120907 A1 | 10/2011 |
| WO | WO 2011/157671 A1 | 12/2011 |
| WO | WO 2012/016803 A1 | 2/2012 |
| WO | WO 2012/055716 A2 | 5/2012 |
| WO | WO 2012/055754 A2 | 5/2012 |
| WO | WO 2012/065879 A1 | 5/2012 |
| WO | WO 2012/069524 A1 | 5/2012 |
| WO | WO 2012/072540 A1 | 6/2012 |
| WO | WO 2012/113737 A1 | 8/2012 |
| WO | WO 2012/136273 A1 | 10/2012 |
| WO | WO 2012/168174 A1 | 12/2012 |
| WO | WO 2013/010788 A2 | 1/2013 |
| WO | WO 2013/041398 A1 | 3/2013 |
| WO | WO 2013/041425 A1 | 3/2013 |
| WO | WO 2013/050311 A1 | 4/2013 |

OTHER PUBLICATIONS

U.S. Appl. No. 13/614,092, filed Sep. 13, 2012, Klopsch, et al.
U.S. Appl. No. 13/611,604, filed Sep. 12, 2012, Yu, et al.
U.S. Appl. No. 13/644,413, filed Oct. 4, 2012, Klopsch, et al.
Technical Bulletin "JEFFSOL® Carbonates in Epoxy Formulations", Huntsman, 2005, 5 pages.
International Search Report and Written Opinion of the International Searching Authority issued Dec. 6, 2013, in PCT/EP2013/053229 (with English Translation of Categories of Cited Documents).

* cited by examiner

*Primary Examiner* — Megan McCulley
(74) *Attorney, Agent, or Firm* — Oblon, McClelland, Maier & Neustadt, L.L.P.

(57) ABSTRACT

The subject matter of the present invention relates to a blend comprising an epoxy resin, a cyclic carbonate, and a hardener comprising a polyalkoxypolyamine, another amine, and a catalyst, to a process for producing said blend, to the use of the blend of the invention for producing cured epoxy resin, and also to an epoxy resin cured with the blend of the invention, and in particular to fiber-reinforced cured epoxy resins for use in rotor blades for wind turbines.

21 Claims, 1 Drawing Sheet

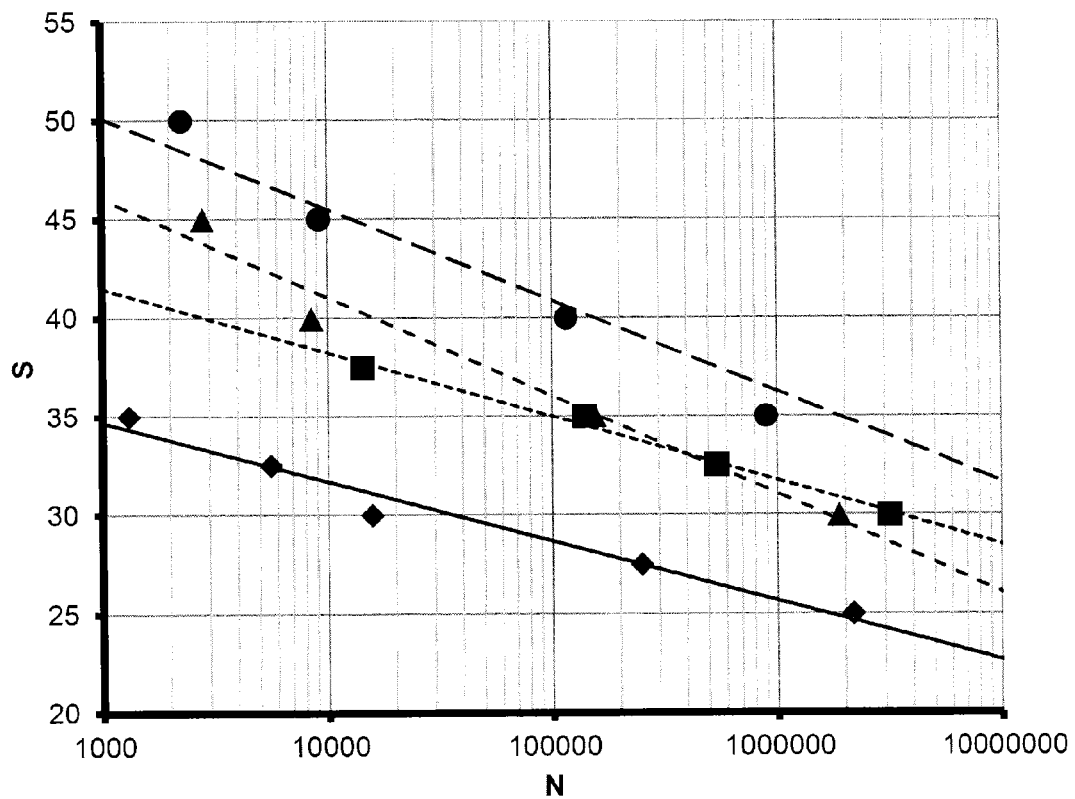
◆ : Comparative example 7,
■ : Inventive example 5,
▲ : Inventive example 3,
● : Inventive example 2,

BLENDS FOR COMPOSITE MATERIALS

The subject matter of the present invention relates to a blend comprising an epoxy resin, a cyclic carbonate, and a hardener comprising a polyalkoxypolyamine, another amine, and a catalyst, to a process for producing said blend, to the use of the blend of the invention for producing cured epoxy resin, and also to an epoxy resin cured with the blend of the invention, and in particular to fiber-reinforced cured epoxy resins for use in rotor blades for wind turbines.

Blends made of curable epoxy compositions and use of these for producing composite materials are known and are described in numerous publications in patents and other literature, for example in "Handbook of Epoxy Resins", McGraw-Hill 1967, by H. Lee and K. Neville. If components and quantitative proportions of these with respect to one another are suitably selected in blends comprising epoxy resins and curing agents (hardeners), these can be reacted to give, after hardening of the blends, materials known as cured epoxy resins which have very good mechanical properties, as described in EP-A 2307358.

Traditional hardeners for epoxy resins are amines. Use of amines to cure epoxies is found inter alia in what are known as infusion technologies, in particular in VARTM processes. Here, di- and polyepoxy resins are mixed with amines immediately prior to the charging procedure to give the blend, the blend is sucked or pumped at temperatures from 20° C. to 50° C. into a mold, and then is reacted at mold temperatures from 55° C. to 90° C., with resultant hardening of the blend. The speed of the entire process here depends on the duration of the charging step, the actual infusion, and on the duration of the hardening process.

One specific major application sector for cured epoxy resins is the use for the production of components made of fiber-reinforced plastics where the mechanical reinforcement is provided by glass fibers, or by carbon or other fibers. Fiber-reinforced plastics are used as materials for motor vehicles, for aircraft, for ships and boats, and for sports items, and rotor blades of wind turbines.

In recent years, the dimensions of rotor blades for wind turbines have increased, and this has also led to more stringent requirements in particular relating to the mechanical properties of the blends which, after full curing, produce the rotor blades, and which have to comply with the more stringent technical requirements. Industrial production of rotor blades for wind turbines generally uses the vacuum infusion process or "vacuum assisted resin transfer molding" process (VARTM). An increase in the level of mechanical properties of the blends can be achieved by using the cyclic carbonates described in "Technical Bulletin JEFFSOL® CARBONATES IN EPOXY FORMULATIONS", Huntsman, 2005.

In the production of lightweight composite workpieces such as rotor blades of wind turbines, for example, it is usual to arrange lightweight construction materials such as balsa or, in particular, PVC foam in a layer structure with reinforcing fibers and curable epoxy resin compositions. Subsequent to the curing of the epoxy resin composition, the PVC foam may then react, depending on the epoxy resin composition used, with discoloration. Such discolorations in PVC have been described (H. Wechsler, Journal of Polymer Science, 11 (1953), 233).

WO2010/010045 describes blends of a resin component and a hardener component comprising not only aminic hardeners which comprise polyetherpolyamine and are used in a substoichiometric amount, but also a guanidine-based catalytic hardener—especially for use in large composite components.

The cyclic carbonates described in U.S. Pat. No. 3,305,527 are good reactive diluents for epoxy resins. The blends described in U.S. Pat. No. 3,305,527, which comprise liquid amines as hardeners at temperatures from 20° C. to 50° C., increase the reactivity of the epoxy resin. However, an essential factor for the production of large components, such as wind turbines, is that the viscosity of the blend does not rise sufficiently rapidly to be a cause either of inadequate wetting of the fibers or else of failure to achieve complete filling of the mold with the blend before curing has proceeded through the blend to an extent that prevents further processing. The relevant blends described in U.S. Pat. No. 3,305,527 cannot therefore be used in large components produced by means of VARTM technology, because of excessive reactivity and therefore excessively rapid hardening.

The "Technical Bulletin JEFFSOL® CARBONATES IN EPOXY FORMULATIONS", Huntsman, 2005, likewise says that cyclic carbonates are known to reduce thermal stability in blends. Thermal stability is described by means of the heat deflection temperature (HDT), which is required by Germanischer Lloyd to be above 70° C. for a cured blend. Germanischer Lloyd is responsible for certification procedures which are a requirement for the construction of wind turbines. Said heat deflection temperatures for the relevant blends described in U.S. Pat. No. 3,305,527 are below 65° C.

JP 2002-187936 likewise describes blends, which comprise three components, namely an epoxide, an amine, and a tertiary amine, where the ratio of active hydrogen atoms to epoxy groups is intended to be in the range from 0.3 to 0.8 and the ratio by weight of tertiary amines to epoxy resin is intended to be in the range from 0.001 to 0.1. JP 2002-187936 does not disclose blends which also comprise cyclic carbonates, alongside the epoxide.

WO-A1 2011/112405 describes a process for reducing exothermicity, where cyclic carbonates, in particular propylene carbonate, and a hardener, are used alongside epoxides. The hardener is preferably one selected from the group of a cyclic aliphatic amine, such as IPDA, and a polyalkoxypolyamine. There is no disclosure of a combination, within the blend, of at least three compounds which bear nitrogen atoms and which also can be used in a substoichiometric ratio in relation to the entirety of cyclic carbonate and epoxy groups, where the blend nevertheless has the desired mechanical properties after hardening.

It was therefore the object of the present invention to provide a blend which retains sufficient flowability for the VARTM process to permit production of large fiber-reinforced molding parts, in particular rotor blades for wind turbines, but which secondly achieves complete hardening within a short time and moreover complies with or exceeds the stringent mechanical demands required for the use of large fiber-reinforced molding parts, for example increased tensile strength, tensile strain at break and flexural strength, and also thermal stability. Sufficient flowability exists especially when the initial viscosity of the blend (at 25° C., for example) is comparatively low and the blend viscosity rises only slowly at elevated temperature (at 40° C., for example). It is also desirable for discoloration of the PVC foam to be as far as possible avoided when the blend is cured, in the case of composite moldings comprising PVC foam. A further desire is for moldings of cured blend to have not only good static mechanical properties but also good dynamic stability.

Said object is achieved via a blend comprising a) an epoxy resin component comprising
- a1) from 75 to 97 parts by weight, based on epoxy resin component a), of one or more epoxy resins selected from the group of aromatic epoxy resins and/or cycloaliphatic epoxy resins, and
- a2) from 3 to 18 parts by weight, based on epoxy resin component a), of one or more cyclic carbonates selected from the group of cyclic carbonates having from 1 to 10 carbon atoms, and
- a3) from 0 to 15 parts by weight, based on epoxy resin component a), of one or more reactive diluents,
- where the parts by weight of components a1) to a3) always give a total of 100, and b) a hardener comprising
- b1) from 10 to 79 parts by weight, based on the hardener b), of one or more polyalkoxypolyamines, and
- b2) from 20 to 89 parts by weight, based on the hardener b), of one or more other amines selected from the group of aromatic, arylaliphatic, cycloaliphatic, heterocyclic and aliphatic polyamines having at least 3 carbon atoms and at least 4 reactive NH functions in primary and/or secondary amino groups, and
- b3) from 0.5 to 30 parts by weight, based on the hardener b), of one or more catalysts selected from the group of tertiary amines, imidazoles, imidazolines, guanidines having less than 3 carbon atoms and/or less than 4 reactive NH functions in amino groups, secondary amines having less than 4 reactive NH functions, urea compounds and ketimines,
- where the parts by weight of components b1) to b3) always give a total of 100, where the ratio of amino equivalents of the hardener b) to the equivalent of the entirety of epoxy resin, reactive diluent and cyclic carbonate in epoxy resin component a) used is in the range from 0.3 to 0.9, where the reactive diluents a3) are those selected from the group of 1,4-butanediol bisglycidyl ether, 1,6-hexanediol bisglycidyl ether, glycidyl neodecanoate, glycidyl versatate, 2-ethylhexyl glycidyl ether, $C_8$-$C_{10}$-alkyl glycidyl ether, $C_{12}$-$C_{14}$-alkyl glycidyl ether, $C_{13}$-$C_{15}$-alkyl glycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether (TMP), glyceryl triglycidyl ether, triglycidyl paraminophenol (TGPAP), divinyl benzyl dioxide and dicyclopentadiene diepoxide.

For the purposes of the present invention, the NH functionality means the number of reactive hydrogen atoms in the amino groups of a compound. Accordingly, for example, a primary monoamine has an NH functionality of 2, a primary diamine an NH functionality of 4, and an amine having 3 secondary amino groups an NH functionality of 3.

In an advantageous embodiment of the blend of the invention, the epoxy resins a1) are those selected from the group of bisphenol A bisglycidyl ether and/or bisphenol F bisglycidyl ether.

In an advantageous embodiment of the blend of the invention, the cyclic carbonates a2) are propylene carbonate and/or ethylene carbonate and/or butylene carbonate.

In an advantageous embodiment of the blend of the invention, the reactive diluents a3) are those selected from the group of 1,4-butanediol bisglycidyl ether, 1,6-hexanediol bisglycidyl ether, $C_{12}$-$C_{14}$-alkyl glycidyl ether, $C_{13}$-$C_{15}$-alkyl glycidyl ether and trimethylolpropane triglycidyl ether (TMP).

In an advantageous embodiment of the blend of the invention, the reactive diluents a3) are those selected from the group of 1,4-butanediol bisglycidyl ether, 1,6-hexanediol bisglycidyl ether, $C_{12}$-$C_{14}$-alkyl glycidyl ether and $C_{13}$-$C_{15}$-alkyl glycidyl ether.

In an advantageous embodiment of the blend of the invention, the polyalkoxypolyamine b1) is one selected from the group of Polyetheramin D230 (D230), Polyetheramin D 400, Polyetheramin T 403, Polyetheramin T 5000 and Jeffamine® XTJ-568 (XTJ 568).

In an advantageous embodiment of the blend of the invention, the other amine b2) is isophoronediamine (IPDA) and/or a mixture of 4-methylcyclohexane-1,3-diamine and 2-methylcyclohexane-1,3-diamine (MDACH).

In an advantageous embodiment of the blend of the invention, the catalyst b3) is one selected from the group of tetramethylguanidine (TMG), 2,4,6-tris(dimethylaminomethyl)phenol (DMP 30), 1,4-diazabicyclo[2.2.2]octane (DABCO), and a mixture of these.

In an advantageous embodiment of the blend of the invention, the viscosity of the blend of the invention at 25° C. is smaller than 350 mPas. If this viscosity is too high for a blend, then the flowability of the blend is no longer sufficient for the production of large composite moldings, by means of VARTM processes, for example.

In an advantageous embodiment of the blend of the invention, the viscosity rise at 40° C. requires more than 90 minutes to reach 1000 mPas. If this time span is too low for a blend, then the flowability of the blend is no longer sufficient for the production of large composite moldings, by means of VARTM processes, for example.

In an advantageous embodiment of the blend of the invention, the blend of the invention also comprises reinforcement fibers.

The invention further provides a process for producing the blend of the invention, where epoxy resin component a) and the hardener b) are mixed at temperatures below the curing-onset temperature.

The invention provides the use of the blend of the invention for producing cured epoxy resins.

In an advantageous embodiment of the use of the invention, the cured epoxy resins are moldings.

In an advantageous embodiment of the use of the invention, the molding comprises reinforcing material.

The present invention further provides a cured epoxy resin obtainable via curing of the blend of the invention, when the HDT of the cured epoxy resin is above 70° C.

In an advantageous embodiment of the cured epoxy resin of the invention, the cured epoxy resin is a molding.

The invention further provides a molding which has fiber-reinforcement.

In an advantageous embodiment of the molding of the invention, it is obtainable via hardening in a mold which has been lined with a fiber-reinforced material, and introduction of the blend of the invention by means of VARTM technology into the mold.

In an advantageous embodiment of the molding of the invention, the molding is a reinforced component for rotor blades of wind turbines.

The blends of the invention comprise an epoxy resin component a), which comprises at least one epoxy resin a1) and one cyclic carbonate a2).

The blend of the invention can use, as epoxy resins a1), any of the epoxy resins selected from the group of bisphenol A bisglycidyl ether (DGEBA), bisphenol F bisglycidyl ether, ring-hydrogenated bisphenol A bisglycidyl ether, ring-hydrogenated bisphenol F bisglycidyl ether, bisphenol S bisglycidyl ether (DGEBS), tetraglycidylmethylenedianiline (TGMDA), epoxy novolaks (the reaction products from epichlorohydrin and phenolic resins (novolak)), cycloaliphatic epoxy resins, such as 3,4-epoxycyclohexylmethyl 3,4-epoxycyclohexanecarboxylate and diglycidyl hexahydrophthalate. The epoxy resins a1) are preferably those selected from the group of bisphenol A bisglycidyl ether, bisphenol F bisglycidyl ether, and mixtures of these two epoxy resins. It is possible to use one or more epoxy resins a1) in the blends of the invention. It is preferable to use only one epoxy resin a1).

Epoxy resin component a) moreover also involves, alongside the epoxy resins a1), the use of one or more cyclic carbonates a2). The cyclic carbonates a2) here are those selected from the group of cyclic carbonates having from 1 to 10 carbon atoms, preferably ethylene carbonate, propylene carbonate, butylene carbonate, pentylene carbonate and glycerol carbonate. One or more cyclic carbonates can be used as cyclic carbonate a2) in epoxy resin component a). It is preferable to use one cyclic carbonate a2). It is particularly preferable to use propylene carbonate as cyclic carbonate a2).

Reactive diluents a3) can also be present alongside the epoxy resins a1) and the cyclic carbonates a2) in epoxy resin component a) of the blend of the invention. Said reactive diluents a3) here are those selected from the group of 1,4-butanediol bisglycidyl ether, 1,6-hexanediol bisglycidyl ether, glycidyl neodecanoate, glycidyl versatate, 2-ethylhexyl glycidyl ether, $C_8$-$C_{10}$-alkyl glycidyl ether, $C_{12}$-$C_{14}$-alkyl glycidyl ether, $C_{13}$-$C_{15}$-alkyl glycidyl ether, p-tert-butyl glycidic ether, butyl glycidic ether, nonylphenyl glycidic ether, p-tert-butylphenyl glycidic ether, phenyl glycidic ether, o-cresyl glycidic ether, polyoxypropylene glycol diglycidic ether, trimethylolpropane triglycidic ether (TMP), glycerol triglycidic ether, triglycidyl-p-aminophenol (TGPAP), divinylbenzyl dioxide and dicyclopentadiene diepoxide. The reactive diluents a3) are preferably those selected from the group of 1,4-butanediol bisglycidyl ether, 1,6-hexanediol bisglycidyl ether, $C_{12}$-$C_{14}$-alkyl glycidyl ether, $C_{13}$-$C_{15}$-alkyl glycidyl ether, and mixtures of said compounds. Again in the case of the reactive diluents a3), it is possible to use one or more reactive diluents. It is preferable to use a maximum of one reactive diluent.

The respective proportion of the epoxy resins a1), of the cyclic carbonates a2) and of the optionally used reactive diluents a3), within the epoxy resin component, is a feature that is highly critical for the blend of the invention with a view to achieving, within the resultant cured epoxy resin or the corresponding molding, the physical features required for a cured epoxy resin consisting of a blend intended for processing by means of VARTM processes, examples being tensile strength and tensile strain at break values.

The proportion of epoxy resin a1) for the blend of the invention is therefore in the range from 75 to 97 parts by weight, preferably in the range from 80 to 95 parts by weight, particularly preferably in the range from 85 to 94 parts by weight, based on epoxy resin component a).

The proportion of the cyclic carbonates a2) for the blend of the invention is in the range from 3 to 18 parts by weight, preferably in the range from 5 to 15 parts by weight, particularly preferably in the range from 6 to 13 parts by weight, based on epoxy resin component a).

In one particular embodiment of the blend of the invention, the proportion of the cyclic carbonates a2) is in the range from 6 to 18 parts by weight, and the cyclic carbonate a2) is preferably propylene carbonate. Another feature of these blends is that the hardened epoxy resins therefrom have particularly good dynamic stabilities.

As a measure of the dynamic stability, the fatigue strength can be employed. It can be determined in a Wöhler long-term vibration test. For this purpose, a test element is loaded cyclically, usually under a stress which is sinusoidal over time. The test is carried out until the test element breaks, under constant stress amplitude in each case. The stress amplitude employed in each case, against the number of load cycles achieved until breakage (load cycle number), produces a characteristic line for the material under test (Wöhler line). Dynamic stability is comparatively high when for a defined stress amplitude a comparatively high load cycle number is achieved, or when a defined load cycle number is achieved with a comparatively high stress amplitude.

The proportion of the reactive diluents a3) is moreover in the range from 0 to 15 parts by weight, preferably from 0 to 10 parts by weights, based on epoxy resin component a).

Selection of the proportions of the individual groups a1) to a3) within epoxy resin component a) has to be such that the parts by weight of groups a1) to a3) give a total of 100.

In preferred combinations, a1) is in the range from 75 to 97 parts by weight, a2) is in the range from 3 to 18 parts by weights, and a3) is in the range from 0 to 15 parts by weight, based in each case on epoxy resin component a). In a particularly preferred embodiment, a1) is in the range from 80 to 95 parts by weight, a2) is in the range from 5 to 15 parts by weight and a3) is in the range from 0 to 10 parts by weight, based in each case on epoxy resin component a). In a very particularly preferred embodiment, a1) is in the range from 85 to 94 parts by weight, a2) is in the range from 6 to 13 parts by weight, and a3) is in the range from 0 to 10 parts by weight, based on epoxy resin component a), and the entirety of groups a1) and a2) gives a total of 100.

The blends of the invention also comprise, alongside epoxy resin component a), a hardener b). The hardener b) in turn comprises at least one polyalkoxypolyamine b1), at least one other amine b2), selected from the group of aromatic, arylaliphatic, cycloaliphatic, heterocyclic and aliphatic polyamines having at least 3 carbon atoms and at least 4 reactive NH functions in primary and/or secondary amino groups, and at least one catalyst b3).

The polyalkoxypolyamines b1) here can be those selected from the group of 3,6-dioxa-1,8-octanediamine, 4,7,10-trioxa-1,13-tridecanediamine, 4,7-dioxa-1,10-decanediamine, 4,9-dioxa-1,12-docecanediamine, polyetheramines based on triethylene glycol with average molecular weight 148, difunctional, primary polyetheramine produced via amination of a propylene-oxide-grafted ethylene glycol with average molecular weight 176, difunctional, primary polyetheramine based on propylene oxide with average molecular weight 4000, difunctional, primary polyetheramine produced via amination of a propylene-oxide-grafted polyethylene glycol with average molecular weight 2000, aliphatic polyetheramine based on propylene-oxide-grafted polyethylene glycol with average molecular weight 900, aliphatic polyetheramine based on propylene-oxide-grafted polyethylene glycol with average molecular weight 600, difunctional, primary polyetheramine produced via amination of a propylene-oxide-grafted diethylene glycol with average molecular weight 220, aliphatic polyetheramine based on a copolymer of poly(tetramethylene ether glycol) and polypropylene glycol with average molecular weight 1000, aliphatic polyetheramine based on a copolymer of poly(tetramethylene ether glycol) and polypropylene glycol with average molecular weight 1900, aliphatic polyetheramine based on a copolymer of poly(tetramethylene ether glycol) and polypropylene glycol with average molecular weight 1400, polyethertriamine based on butylene-oxide-grafted at least trihydric alcohol with average molecular weight 400, aliphatic polyetheramine produced via amination of butylene-oxide-grafted alcohols with average molecular weight 219 (Jeffamine®XTJ 568 (XTJ 568)), polyetheramine based on pentaerythritol and propylene oxide with average molecular weight 600, difunctional, primary polyetheramine based on polypropylene glycol with average molecular weight 2000, difunctional, primary polyetheramine based on polypropylene glycol with average molecular weight 230 (D 230), difunctional, primary polyetheramine based on polypropylene glycol with average molecular weight 400 (D 400), trifunctional, primary polyetheramine produced via reaction of propylene oxide with trimethylolpropane followed by amination of the terminal OH groups with average molecular weight 403 (T403), trifunctional, primary polyetheramine produced via reaction of propylene oxide with glycerol followed by amination of the terminal OH groups with average molecular weight 5000 (T 5000), and a polyetheramine with average molecular weight 400 produced via amination of polyTHF which has average molecular weight 250. Preferred polyalkoxypolyamines b1) are those selected from the group of polyetheramine D230 (D230), polyetheramine D 400, polyetheramine T 403, polyetheramine T 5000, Jeffamine®XTJ 568 (XTJ 568), and mixtures of these. The hardener b) can use either one or else more than one polyalkoxypolyamine(s) b1). It is preferable to use only one polyalkoxypolyamine as b1). It is very particularly preferable that the polyalkoxypolyamine b1) is polyetheramine D 230 (D230) and/or Jeffamine®XTJ 568 (XTJ 568).

The hardener b) also comprises, alongside the polyalkoxypolyamines b1), at least one other amine b2). Polyalkoxypolyamines b1) are not to be included in the group of the other amines b2). The other amines b2) here can be those selected from the group of 1,12-diaminododecane, 1,10-diaminodecane, 1,2-diaminocyclohexane, 1,2-propanediamine, 1,3-bis(aminomethyl)cyclohexane, 1,3-propanediamine, 1-methyl-2,4-diaminocyclohexane, 2,2'-oxybis(ethylamine), 3,3'-dimethyl-4,4'-diaminodicyclohexylmethane, 4,4'-methylenedianiline, 4-ethyl-4-methylamino-1-octylamine, diethylenetriamine, ethylenediamine, hexamethylenediamine, isophoronediamine, a mixture of 4-methylcyclohexane-1,3-diamine and 2-methylcyclohexane-1,3-diamine (MDACH), menthenediamine, xylylenediamine, N-aminoethylpiperazine, neopentanediamine, norbornanediamine, octanemethylenediamine, piperazine, 4,8-diaminotricyclo[5.2.1.0]decane, tolylenediamine, triethylenetetramine, and trimethylhexamethylenediamine. It is preferable that the other amines b2) are those selected from the group of isophoronediamine (IPDA), a mixture of 4-methylcyclohexane-1,3-diamine and 2-methylcyclohexane-1,3-diamine (MDACH), and mixtures of said amines. Particular preference is given to the mixture of 4-methylcyclohexane-1,3-diamine and 2-methylcyclohexane-1,3-diamine (MDACH) as other amine b2) in the hardener b) of the blend of the invention.

The hardener b) of the blend of the invention also always has to comprise a catalyst b3) alongside the polyalkoxypolyamine b1) and the other amine b2). The catalyst b3) is selected from the group of tertiary amines, imidazoles, imidazolines, guanidines having less than 3 carbon atoms and/or less than 4 reactive NH functions in amino groups, secondary amines having less than 4 reactive NH functions, urea compounds, and ketimines. The catalyst b3) is preferably selected from the group of tertiary amines, imidazoles, guanidines having less than 3 carbon atoms and/or less than 4 reactive NH functions in amino groups, and urea compounds. More preferably the catalyst b3) is selected from the group of tertiary amines and guanidines having less than 3 carbon atoms and/or less than 4 reactive NH functions in amino groups.

Tertiary amines are, for example, N,N-dimethylbenzylamine, 2,4,6-tris(dimethylaminomethyl)phenol (DMP 30), 1,4-diazabicyclo[2.2.2]octane (DABCO), 1,8-diazabicyclo[5.4.0]undec-7-ene (DBU), S-triazine (Lupragen N 600), bis(2-dimethylaminoethyl) ether (Lupragen N 206), pentamethyldiethylenetriamine (Lupragen N 301), trimethylaminoethylethanolamine (Lupragen N 400), tetramethyl-1,6-hexanediamine (Lupragen N 500), aminoethylmorpholine, aminopropylmorpholine, aminoethylethyleneurea or N-alkyl-substituted piperidine derivatives. Imidazoles are imidazole itself and its derivatives such as, for example, 1-methylimidazole, 2-methylimidazole, N-butylimidazole, benzimidazole, N—$C_{1-12}$-alkylimidazoles, N-arylimidazoles, 2,4-ethylmethylimidazole, 2-phenylimidazole, 1-cyanoethylimidazole or N-aminopropylimidazole. Imidazolines are imidazoline itself and its derivatives such as, for example, 2-phenylimidazoline. Guanidines having less than 3 carbon atoms and/or less than 4 reactive NH functions in amino groups are guanidine itself or its derivatives such as, for example, methylguanidine, dimethylguanidine, trimethylguanidine, tetramethylguanidine (TMG), methyl isobiguanide, dimethyl isobiguanide, tetramethyl isobiguanide, hexamethyl isobiguanide, heptamethyl isobiguanide or dicyandiamine (DICY). Secondary amines having less than 4 reactive NH functions are, for example, N,N'-diisopropylisophoronediamine (Jefflink® XTJ-584), N,N'-diisobutyl-4,4"-diaminodicyclohexylmethane (Clearlink 1000), N-(hydroxyethyl)aniline, di(2-methoxyethyl)amine, piperidine or dialkylamines such as di(2-ethylhexyl)amine, dibutylamine, dipropylamine, ditridecylamine. Urea compounds are urea itself and its derivatives such as, for example, 3-(4-chlorophenyl)-1,1-dimethylurea (monuron), 3-phenyl-1,1-dimethylurea (fenuron), 3-(3,4-dichlorophenyl)-1,1-dimethylurea (diuron), 3-(3-chloro-4-methylphenyl)-1,1-dimethylurea (chlorotoluron), and tolyl-2,4-bis-N,N-dimethylcarbamide (Amicure UR2T). Ketimines are, for example, Epi-Kure 3502 (a reaction product from ethylenediamine with methyl isobutyl ketone).

It is preferable that the catalyst b3) is one selected from the group of tetramethylguanidine (TMG), 2,4,6-tris(dimethylaminomethyl)phenol (DMP 30) and 1,4-diazabicyclo[2.2.2]octane (DABCO). In a particular embodiment, the catalyst b3) is TMG and/or DMP 30. In a further preferred embodiment, the catalyst b3) is DABCO.

The respective proportion of the polyalkoxypolyamine b1), the other amine b2) and the catalyst b3) is a very critical feature with a view to obtaining the desired physical properties in the cured blend of the invention.

The proportion of the polyalkoxypolyamines b1) is in the range from 10 to 79 parts by weight, based on the hardener b), preferably in the range from 20 to 70 parts by weight, based on the hardener b), particularly preferably in the range from 20 to 60 parts by weight, based on the hardener b), in particular in the range from 22 to 58 parts by weight, based on the hardener b).

The proportion of other amines b2) in the hardener b) in the blend of the invention is in the range from 20 to 89 parts by weight, preferably in the range from 29 to 79 parts by weight, and particularly preferably in the range from 30 to 60 parts by weight, based on the hardener b).

The proportion of the catalyst b3) in the hardener b) of the blend of the invention is in the range from 0.5 to 30 parts by weight, based on the hardener b). The lower limit of this range is preferably at 1, more particularly at 2, more particularly at 4 parts by weight. The upper limit of this range is preferably at 20 parts by weight.

In one particular embodiment of the blend of the invention, the proportion of the catalyst b3) in the hardener b) is in the range from 0.5 to 7 parts by weight, preferably in the range from 1 to 5 parts by weight, based in each case on the hardener b), and the catalyst b3) is preferably DPM-30 and/or DABCO, more preferably DABCO. Another feature of these blends is that when they are cured, in the case of PVC-containing composite moldings, discoloration of the PVC is prevented to a particularly effective degree.

Selection of the proportions of the individual groups b1) to b3) within the hardener b) has to be such that the parts by weight of groups b1) to b3) give a total of 100.

Preferred constitutions of the groups b1 to b3) within the hardener b) are those having the polyalkoxypolyamines b1) in the range from 10 to 79 parts by weight, the other amines b2) in the range from 20 to 89 parts by weight, and the catalysts b3) in the range from 0.5 to 30 parts by weight, based in each case on the hardener b). Preference is given to those constitutions having the polyalkoxypolyamines b1) in the range from 20 to 70 parts by weight, the other amines b2) in the range from 29 to 79 parts by weight, and the catalyst b3) in the range from 1 to 20, based in each case on the hardener b).

The blend of the invention is mixed by mechanical methods known to the person skilled in the art, from the individual constituents, at temperatures below 160° C., preferably in the range from 5 to 30° C.

In one embodiment of the present invention, the viscosity of the blend is smaller than 500 mPas at 25° C., preferably smaller than 400 mPas at 25° C., particularly preferably smaller than 350 mPas at 25° C.

It is preferable that the time required by the blend of the invention to reach a viscosity of 1000 mPa s at 40° C., measured in accordance with DIN 16945, is longer than 60 minutes, preferably longer than 80 min, particularly preferably longer than 90 minutes.

The heat deflection temperature (HDT (determined in accordance with ISO 75 A)) of the blend of the invention, after complete hardening, is above 70° C.

Complete hardening of the blend of the invention gives a cured epoxy resin. The tensile strength of the cured epoxy resin (determined in accordance with ISO 527) is greater than or equal to 70 MPa, preferably greater than 74 MPa, particularly preferably greater than 78 MPa. The tensile modulus of the cured epoxy resin of the invention (determined in accordance with ISO 527) is greater than or equal to 3100 MPa, preferably greater than 3200 MPa, particularly preferably greater than 3300 MPa.

The tensile strain at break of the cured epoxy resin of the invention (determined in accordance with ISO 527) is greater than 6.0%, preferably greater than 6.5%, particularly preferably greater than 7%.

The flexural strength of the cured epoxy resin of the invention (determined in accordance with ISO 178) is greater than 110 MPa, preferably greater than 115 MPa, particularly preferably greater than 120 MPa, especially greater than 125 MPa.

The flexural modulus of the cured epoxy resin of the invention (determined in accordance with ISO 178) is greater than 3200 MPa, preferably greater than 3300 MPa, particularly preferably greater than 3400 MPa.

The combination of tensile strength, tensile strain at break, and flexural strength, in particular, is comparatively good for the cured epoxy resins comprising the blends of the invention. The blends of the invention have the particular feature that the cured epoxy resins obtainable therefrom combine good tensile strength figures of at least 70 MPa with comparatively high tensile strain at break figures of, for example, at least 8.0% and/or with comparatively high flexural strength figures of, for example, at least 120 MPa.

The invention further provides a process for the production of the blend of the invention, where the epoxy resin component a) is mixed with the hardener b) at temperatures below the curing-onset temperature.

The curing-onset temperature is the temperature at which a mixture of a)+b) reacts. This temperature can be determined as $T_{RO}^{E}$ in accordance with DIN 53765 by using a DSC.

When the blend of the invention is used, the curing rate is comparable with that of known blends of the prior art.

The invention further provides the use of the blend of the invention for producing cured epoxy resins, preferably in the form of moldings. These cured epoxy resins may comprise reinforcing fibers.

The invention further provides the process for producing cured epoxy resin wherein the blend of the invention is cured at a temperature greater than or equal to the initial curing temperature, preferably greater than or equal to the initial curing temperature plus 20° C. These cured epoxy resins may comprise reinforcing fibers. Additionally provided is the production of moldings from the cured epoxy resin of the invention. In that case, in one preferred embodiment, the blend of the invention is introduced by means of VARTM technology into the mold, for curing to form the molding.

The present invention further provides the cured epoxy resin which is obtainable or is obtained via hardening of the blend of the invention at a temperature greater than or equal to the curing-onset temperature, preferably greater than or equal to the curing-onset temperature plus 20° C. For this, the blends of the invention are either charged to specific molds or are applied to surfaces, and are hardened via temperature increase. The constitution of the blends for application to surfaces can also comprise other fillers within the blend. These fillers are those selected from the group of the agents with thixotropic effect (e.g. hydrophilic and hydrophobic fumed silicas), UV stabilizers (e.g. nanoscale oxides, such as titanium dioxide and zinc oxide), flame retardants (e.g. polyphosphates and phosphorus), silicates, and carbonates for improvement of mechanical properties. Said fillers can be comprised either in epoxy resin component a) or else in the hardener b), or else can be mixed as component c) into the blend of the invention. The molds used, into which the blend of the invention is introduced, can comprise fiber-reinforcing material or else elements which have to be protected from environmental effects, such as wet conditions, oxygen, dust, or other aggressive materials or effects.

Curing of the blends of the invention gives cured epoxy resins which can be produced either within a mold or else without restriction, outside of any molds. Preferred cured epoxy resins are those hardened in a molding part. Said molding parts are those selected from the group of molding parts for motor vehicles, for aircraft, for ships, for boats, and for sports equipment, and for blades of wind turbines. Particular preference is given to molding parts for rotor blades of wind turbines.

The design of said molding parts can include, or else omit, a fiber-reinforcing material, and/or the blend of the invention can also comprise fiber-reinforcing materials. The fiber-reinforcing materials can comprise textile, uni- and multiaxial laid scrims, nonwovens, and short fibers made of the following fiber materials: glass fibers, carbon or aramid fibers, PE fibers (Dyneema), and basalt fibers. Preference is given to textiles and to uni- and multiaxial laid scrims made of glass fibers and carbon fibers. In the case of large components which have fiber-reinforcement, it is preferable that the components have been designed with the fiber-reinforcing materials. Particular preference is given to uni- and multiaxial laid scrims made of glass fibers. The blade shells for wind turbines are preferably designed with laid scrims of glass fiber.

The moldings are preferably produced by the process of the invention, by providing an appropriate mold, introducing the blend of the invention into said mold, and curing the material to completion only after complete filling of the mold. In the process of the invention it is preferable that the blend of the invention is introduced into the appropriate mold by way of infusion technology. Here, vacuum is applied to the molding part. Said vacuum sucks the blend of the invention into the mold at temperatures below the curing-onset temperature in such a way that the viscosity remains almost unaltered during the charging procedure and all regions of the molding part are filled by the blend before this completes its hardening. Complete hardening of the blend then takes place in the molding. Other heat sources can be applied externally to achieve complete hardening.

FIG. 1 shows the Wôhler plots (stress amplitude S in MPa as y-axis against the load cycle number N as x-axis, with logarithmic scaling) for the cured epoxy resins comprising the blends of comparative example 7 (♦) and the inventive examples 2 (●), 3 (■), and 5 (■).

EXAMPLES

Examples are provided below to illustrate the present invention, but examples serve only to illustrate certain aspects of the invention and should certainly not be considered to restrict the scope of the invention.

The epoxy resin components a) and the hardener components b) for the inventive examples and the comparative examples were put together in accordance with the details in tables 1 and 2. The substances employed were as follows:

Bisphenol A bisglycidyl ether (DGEBA, Epilox® A18-00 from LEUNA-Harze GmbH, EEW=180), 1,4-butanediol bisglycidyl ether (BDGE, Epilox® P13-21 from LEUNA-Harze GmbH), 1,6-hexanediol bisglycidyl ether (HDGE, Epilox® P13-20 from LEUNA-Harze GmbH), C12-C14-alkyl glycidyl ether (C12-C14-AGE, Epilox® P13-18 from LEUNA-Harze GmbH), propylene carbonate (PC, from BASF SE), polyetheramine D230 (D230, Baxxodur® EC 301 from BASF SE), polyetheramine XTJ 568 (XTJ568, Jeffamine®XTJ 568 from Huntsman), isophoronediamine (IPDA, Baxxodur® EC 201 from BASF SE), mixture of 4-methylcyclohexane-1,3-diamine and 2-methylcyclohexane-1,3-diamine (MDACH, Baxxodur® ECX 210 from BASF SE), tetramethylguanidine (TMG, from Lonza), 2,4,6-tris(dimethylaminomethyl)-phenol (DMP-30, from Sigma-Aldrich), and 1,4-diazabicyclo[2.2.2]octane (DABCO, from Sigma-Aldrich).

The respective epoxy resin components a) and hardener components b) were mixed in a ratio such as to give the ratio stated in table 3 for amine equivalents of hardener b) to equivalents of the sum total of epoxy resin, reactive diluent, and cyclic carbonate of epoxy resin component a).

For the blends of these examples, the initial viscosity at 25° C. and the time taken to attain a viscosity of 1000 mPa*s at 40° C. (in accordance with DIN 16945) were recorded. The recorded results are compiled in table 3.

For comparative example 3 and inventive examples 3, 5, and 8, composite workpieces comprising PVC foam (Divinycell H60 from DIAB) and the corresponding blend were produced and were cured at 70° C. for 15 hours. Discoloration of the PVC foam in the vicinity of the blend was assessed visually and evaluated on a scale from 1 (no discernible discoloration) to 5 (very dark discoloration). The results are again compiled in table 3.

The blends of the examples were cured at 70° C. for 15 hours. The heat deflection temperature (HDT), the tensile strength, the tensile modulus, the tensile strain at break, the flexural strength, and the flexural modulus were determined, for the cured epoxy resins comprising the blends, in accordance with the standards ISO 75 A, ISO 527, and ISO 178. The results of the measurements are compiled in table 4.

For comparative example 7 and inventive examples 2, 6, and 8, the fatigue strength was determined as a measure of the dynamic stability. For this purpose, test elements with dimensions of 230 mm×32 mm×2.5 mm were produced from the respective blends, using a biaxial (glass fiber) scrim at 70° C. with curing for 15 hours. The test elements were exposed to single-stage long-term vibration in a tension-pressure threshold test (sinusoidal loading, R=−1, test frequency: 1.5-2 Hz, test direction: +/−45°, test temperature 23° C., relative humidity: 50%). A measurement was made of the number of load cycles until the test element broke, for predetermined stress amplitudes. The measurement values and the resultant characteristic lines (Wöhler curve; stress amplitude S in MPa as y-axis against number of load cycles N as x-axis) are shown in FIG. 1. Inventive examples 2, 6, and 8 exhibit a significantly increased fatigue strength as compared with comparative example 7.

TABLE 1

Constitutions in parts by weight of epoxy resin component a)

|  | DGEBA | BDGE | HDGE | C12-C14-AGE | PC |
|---|---|---|---|---|---|
| Comparative example 1 | 82 | 18 |  |  |  |
| Comparative example 2 | 82 | 18 |  |  |  |
| Comparative example 3 | 78 | 22 |  |  |  |
| Comparative example 4 | 78 | 22 |  |  |  |
| Comparative example 5 | 90 |  |  |  | 10 |
| Comparative example 6 | 80 |  |  |  | 20 |
| Comparative example 7 | 81 |  | 19 |  |  |
| Inventive example 1 | 90 |  |  |  | 10 |
| Inventive example 2 | 90 |  |  |  | 10 |
| Inventive example 3 | 88 |  |  | 4 | 8 |
| Inventive example 4 | 89 |  |  | 4 | 7 |
| Inventive example 5 | 89 |  |  | 4 | 7 |
| Inventive example 6 | 89 |  |  | 3 | 8 |
| Inventive example 7 | 87.5 |  |  | 5 | 7.5 |
| Inventive example 8 | 90 |  |  |  | 10 |
| Inventive example 9 | 89 |  | 2 |  | 9 |
| Inventive example 10 | 89 |  |  | 3 | 8 |

BDGE: 1,4-butanediol bisglycidyl ether;
HDGE: 1,6-hexanediol bisglycidyl ether,
C12-C14-AGE: C12-C14-alkyl glycidyl ether

TABLE 2

Constitutions in parts by weight of hardener component b)

|  | D230 | XTJ 568 | IPDA | MDACH | TMG | DMP-30 | DABCO |
|---|---|---|---|---|---|---|---|
| Comparative example 1 | 60 |  | 40 |  |  |  |  |
| Comparative example 2 | 70 |  |  | 30 |  |  |  |
| Comparative example 3 | 60 |  | 25 |  | 15 |  |  |
| Comparative example 4 | 60 |  | 25 |  |  | 7.5 | 7.5 |
| Comparative example 5 | 60 |  | 40 |  |  |  |  |
| Comparative example 6 | 25 |  |  | 60 | 15 |  |  |
| Comparative example 7 | 60 |  | 40 |  |  |  |  |

TABLE 2-continued

Constitutions in parts by weight of hardener component b)

|  | D230 | XTJ 568 | IPDA | MDACH | TMG | DMP-30 | DABCO |
|---|---|---|---|---|---|---|---|
| Inventive example 1 | 25 |  |  | 55 | 10 | 10 |  |
| Inventive example 2 | 55 |  |  | 35 |  | 10 |  |
| Inventive example 3 | 58 |  |  | 38 |  | 4 |  |
| Inventive example 4 | 49.75 |  |  | 49.75 |  |  | 0.5 |
| Inventive example 5 | 60 |  |  | 39 |  |  | 1 |
| Inventive example 6 |  | 55 | 45 |  |  |  | 2 |
| Inventive example 7 | 47.5 |  |  | 47.5 |  |  | 5 |
| Inventive example 8 |  | 60 | 25 |  | 15 |  |  |
| Inventive example 9 | 59 |  | 39 |  |  | 2 |  |
| Inventive example 10 |  | 39 |  | 59.5 |  |  | 0.5 |

TABLE 3

Blends and their properties

|  | N-equiv. | Visc. | T(1000 mPa*s) | PVC discol. |
|---|---|---|---|---|
| Comparative example 1 | 1 | 275 | 110 | — |
| Comparative example 2 | 1 | 250 | 140 | — |
| Comparative example 3 | 0.6 | 275 | 160 | 5 |
| Comparative example 4 | 0.6 | 320 | 130 | — |
| Comparative example 5 | 1 | 200 | 80 | — |
| Comparative example 6 | 0.6 | 100 | 100 | — |
| Comparative example 7 | 1 | 250 | 120 | — |
| Inventive example 1 | 0.4 | 350 | 90 | — |
| Inventive example 2 | 0.6 | 325 | 100 | — |
| Inventive example 3 | 0.7 | 250 | 130 | 3 |
| Inventive example 4 | 0.9 | 250 | 120 | — |
| Inventive example 5 | 0.9 | 250 | 120 | 1 |
| Inventive example 6 | 0.8 | 300 | 100 | — |
| Inventive example 7 | 0.8 | 300 | 90 | — |
| Inventive example 8 | 0.6 | 325 | 140 | 5 |
| Inventive example 9 | 0.8 | 275 | 100 | — |
| Inventive example 10 | 0.9 | 225 | 120 | — |

N-equiv.: Amine equivalents, per equivalent of epoxy/carbonate
Visc.: Viscosity at 25° C. in mPa*s
T(1000 mPa*s): Time in min until 1000 mPa*s is reached at 40° C.
PVC discol.: Discoloration of PVC foam in contact with blend during hardening: 1: none; 2: very light, 3: light; 4: dark; 5: very dark Table 3 shows that the blends of the invention are comparable in terms of viscosity and reactivity with standard blends which are used in the production of moldings for rotor blades for wind turbines.

TABLE 4

Cured epoxy resins (15 h, 70° C.) and their properties

|  | Tensile s. | Tensile m. | Tensile s.a.b. | Flexural s. | Flexural m. | HDT |
|---|---|---|---|---|---|---|
| Comparative example 1 | 68 | 3100 | 6.5 | 115 | 3200 | 73 |
| Comparative example 2 | 68 | 3100 | 7.5 | 110 | 3100 | 72 |
| Comparative example 3 | 71 | 3100 | 7.5 | 115 | 3100 | 87 |
| Comparative example 4 | 71 | 3000 | 7.5 | 115 | 3100 | 85 |
| Comparative example 5 | 65 | 3200 | 9 | 110 | 3400 | 64 |
| Comparative example 6 | 62 | 3100 | 5.5 | 95 | 3200 | 55 |
| Comparative example 7 | 69 | 3000 | 9.5 | 112 | 3000 | 82 |
| Inventive example 1 | 85 | 3600 | 8.5 | 145 | 3900 | 82 |
| Inventive example 2 | 79 | 3350 | 10 | 125 | 3500 | 84 |
| Inventive example 3 | 72 | 3200 | 12 | 120 | 3300 | 76 |
| Inventive example 4 | 70 | 3200 | 11 | 120 | 3300 | 73 |
| Inventive example 5 | 71 | 3200 | 10 | 120 | 3300 | 71 |
| Inventive example 6 | 72 | 3100 | 9 | 120 | 3200 | 75 |
| Inventive example 7 | 77 | 3200 | 8.5 | 127 | 3300 | 78 |
| Inventive example 8 | 74 | 3300 | 9 | 126 | 3400 | 75 |
| Inventive example 9 | 70 | 3100 | 12 | 113 | 3200 | 71 |
| Inventive example 10 | 72 | 3100 | 11 | 117 | 3300 | 76 |

Tensile s.: Tensile strength in MPa;
Tensile m.: Tensile modulus in MPa;
Tensile s. a. b.: Tensile strain at break in %;
Flexural s.: Flexural strength in MPa;
Flexural m.: Flexural modulus in %;
HDT: Heat deflection temperature in ° C.

Table 4 shows that the cured epoxy resins of the invention exhibit a higher level of mechanical properties and at the same time their HDT is above 70° C.

The invention claimed is:
1. A blend, comprising:
(a) an epoxy resin component comprising:
(a1) from 75 to 97 parts by weight, based on epoxy resin component (a), of one or more epoxy resins selected from the group of aromatic epoxy resins and/or cycloaliphatic epoxy resins, and
(a2) from 3 to 18 parts by weight, based on epoxy resin component (a), of one or more cyclic carbonates selected from the group of cyclic carbonates having from 1 to 10 carbon atoms, and
(a3) from 0 to 15 parts by weight, based on epoxy resin component (a), of one or more reactive diluents,
wherein the parts by weight of components (a1) to (a3) always give a total of 100, and
(b) a hardener comprising:
(b 1) from 10 to 79 parts by weight, based on the hardener (b), of one or more polyalkoxypolyamines, and
(b2) from 20 to 89 parts by weight, based on the hardener (b), of one or more other amines selected from the group of aromatic, arylaliphatic, cycloaliphatic, heterocyclic and aliphatic polyamines having at least 3 carbon atoms and at least 4 reactive NH functions in primary and/or secondary amino groups, and
(b3) from 0.5 to 30 parts by weight, based on the hardener (b), of one or more catalysts selected from the group of tertiary amines, imidazoles, imidazolines, guanidines having less than 3 carbon atoms and/or less than 4 reactive NH functions in amino groups, secondary amines having less than 4 reactive NH functions, substituted ureas, guanamines and ketimines,
wherein the parts by weight of components (b1) to (b3) always give a total of 100, wherein the ratio of amino equivalents of the hardener (b) to the equivalent of the entirety of epoxy resin and cyclic carbonate in epoxy resin component (a) is in the range from 0.3 to 0.9, wherein the reactive diluents (a3) are selected from the group consisting of 1,4-butanediol bisglycidyl ether, 1,6-hexanediol bisglycidyl ether, glycidyl neodecanoate, glycidyl versatate, 2-ethylhexyl glycidyl ether, $C_8$-$C_{10}$-alkyl glycidyl ether, $C_{12}$-$C_{14}$-alkyl glycidyl ether, $C_{13}$-$C_{15}$-alkyl glycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether, glyceryl triglycidyl ether, triglycidyl paraaminophenol, divinyl benzyl dioxide, dicyclopentadiene diepoxide, and mixtures thereof.

2. The blend according to claim 1, wherein the epoxy resins (a1) are those selected from the group of bisphenol A bisglycidyl ether and bisphenol F bisglycidyl ether.

3. The blend according to claim 1, wherein the one or more cyclic carbonates (a2) are propylene carbonate and/or ethylene carbonate.

4. The blend according to claim 1, wherein the one or more reactive diluents (a3) are those selected from the group of 1,4-butanediol bisglycidyl ether, 1,6-hexanediol bisglycidyl ether, $C_{12}$-$C_{14}$-alkyl glycidyl ether, $C_{13}$-$C_{15}$-alkyl glycidyl ether and trimethylolpropane triglycidyl ether.

5. The blend according to claim 1, wherein the one or more reactive diluents (a3) are those selected from the group of 1,4-butanediol bisglycidyl ether, 1,6-hexanediol bisglycidyl ether, $C_{12}$-$C_{14}$-alkyl glycidyl ether and $C_{13}$-$C_{15}$-alkyl glycidyl ether.

6. The blend according to claim 1, wherein the one or more polyalkoxypolyamines (b1) are those selected from the group of Polyetheramin D230, Polyetheramin D 400, Polyetheramin T 403, Polyetheramin T 5000 and aliphatic polyetheramine produced via amination of butylene-oxide-grafted alcohols with average molecular weight 219.

7. The blend according to claim 1, wherein one or more other amines (b2) are isophoronediamine and/or a mixture of 4-methylcyclohexane-1,3-diamine and 2-methylcyclohexane-1,3-diamine.

8. The blend according to claim 1, wherein the blend also comprises reinforcement fibers.

9. The blend according to claim 1, wherein the one or more cyclic carbonates (a2) make up 6 to 18 parts by weight, based on the epoxy resin component (a).

10. The blend according to claim 1, wherein the one or more catalysts (b3) are selected from the group of tertiary amines and guanidines having less than 3 carbon atoms and/or less than 4 reactive NH functions in amino groups.

11. The blend according to claim 1, wherein the one or more catalysts (b3) are selected from the group of tertiary amines.

12. The blend according claim 1, wherein the one or more catalysts (b3) are selected from the group of guanidines having less than 3 carbon atoms and/or less than 4 reactive NH functions in amino groups.

13. The blend according to claim 1, wherein one or more catalysts (b3) are those selected from the group of tetramethylguanidine, 2,4,6-tris(dimethylaminomethyl)phenol and 1,4-diazabicyclo[2.2.2]octane.

14. The blend according to claim 1, wherein the one or more catalysts (b3) are selected from the group of 2,4,6-tris(dimethylaminomethyl)phenol and 1,4-diazabicyclo[2.2.2]octane.

15. The blend according to claim 1, wherein the catalyst (b3) is tetramethylguanidine.

16. The blend according to claim 1, wherein the one or more catalysts (b3) make up 0.5 to 7 parts by weight, based on the hardener (b).

17. The blend according to claim 1, wherein the one or more catalysts (b3) make up 0.5 to 7 parts by weight, based on the hardener (b), and are selected from the group of 2,4,6-tris(dimethylaminomethyl)phenol and 1,4-diazabicyclo[2.2.2]octane.

18. The blend according to claim 1, wherein the catalyst (b3) makes up 0.5 to 7 parts by weight, based on the hardener (b), and is 1,4-diazabicyclo[2.2.2]octane.

19. A process for producing the blend according to claim 1, wherein epoxy resin component (a) and the hardener (b) are mixed at temperatures below the curing-onset temperature.

20. A process for producing a cured epoxy resin, wherein the blend according to claim 1 is cured at a temperature greater than or equal to the curing-onset temperature.

21. A cured epoxy resin obtainable via curing of the blend according to claim 1 at a temperature greater than or equal to the curing-onset temperature.

* * * * *